Figure 1:
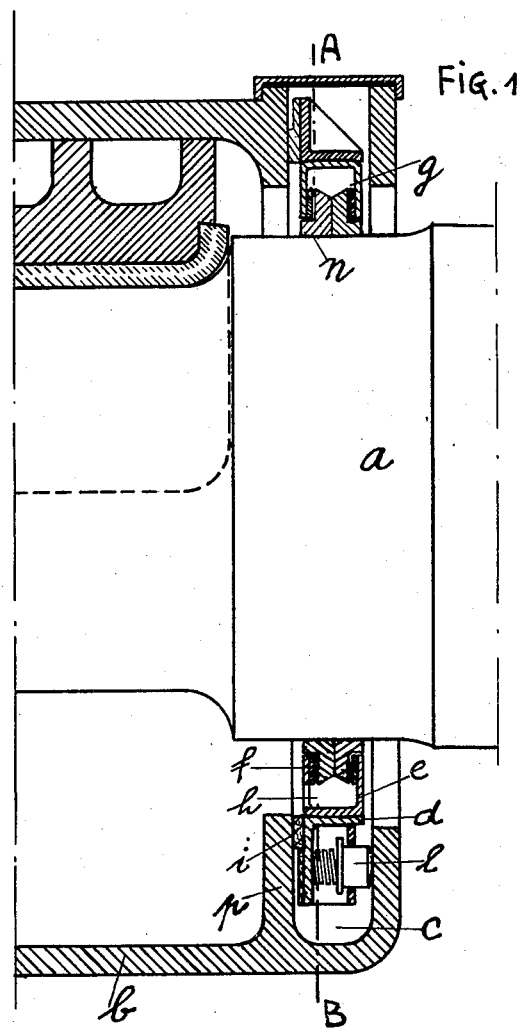

June 5, 1945. G. STROMEIER 2,377,387
AXLE BOX SEAL
Filed Jan. 14, 1941 3 Sheets-Sheet 1

Inventor:
G. Stromeier

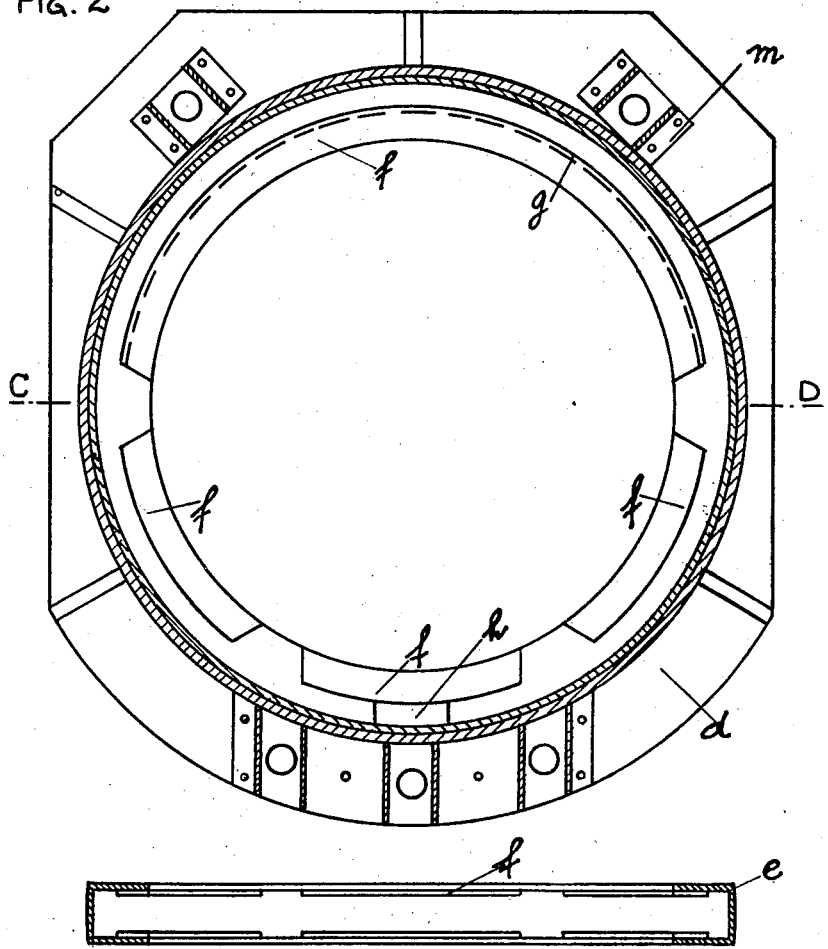

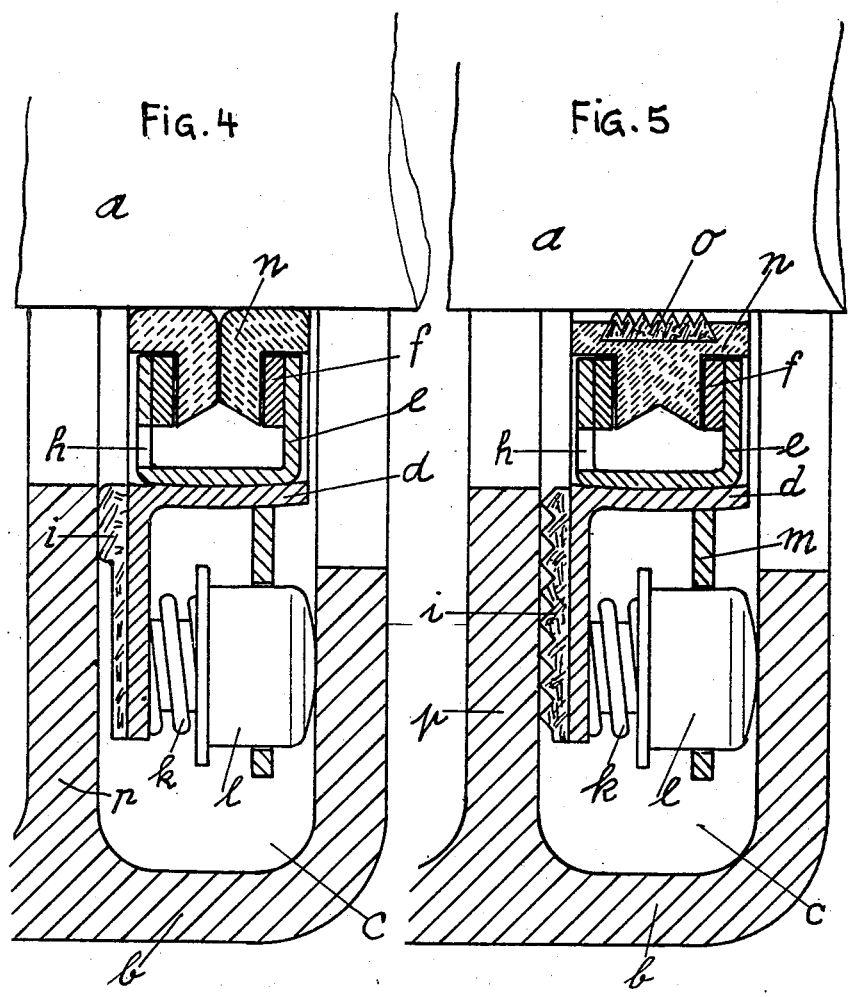

Patented June 5, 1945

2,377,387

UNITED STATES PATENT OFFICE 2,377,387

AXLE BOX SEAL

Gustav Stromeier, Berlin-Charlottenburg, Germany; vested in the Alien Property Custodian Application January 14, 1941, Serial No. 374,404
In Germany January 20, 1940

6 Claims. (Cl. 286—6)

This invention relates to improvements for railroad vehicles and in particular to an arrangement, which is adapted to prevent the escape of oil from the axle boxes of such vehicles.

It is an object of my invention to provide for a certain clearance between the packing elements of said axle boxes so as to secure always a close contact of such elements; more in detail, the invention consists in providing a curved or spherical interface between the oil-collecting member of the so called oil thrower and a supporting ring surrounding it.

A still further object of my invention resides in the arrangement of elastic packing layers in the area of sealing interfaces.

It is to be noted that in the case of railroad cars and other vehicles to be driven on rails, axle bearings are chiefly used as axle boxes, in which adjoining the space for the bearing proper, a packing chamber is provided, within which devices are arranged for the purpose of preventing the oil from escaping along the axle. Types are also known, in which a circulating oil thrower (splash ring) is provided within said packing chamber, so as to be displaceable along the axle-journal. The packing devices hitherto known did not, however, prove to be satisfactory, because the leakage of oil is not prevented by them in a reliable manner.

The present invention aims to overcome said drawbacks. It consists, generally speaking, of a bearing ring, the internal cylinder surface of which in the axial direction is of spherical shape, the correspondingly shaped external cylinder surface of an annular oil collection chamber or member being borne by said spherical surface. The lateral walls of this oil collection chamber are provided with oil scraping edges which rest against the oil thrower. In consequence of the globular shape of said bearing surfaces arranged between the bearing ring and the oil collection chamber, a certain amount of clearance exists between said two parts, whereby the scraping edges are enabled to press themselves closely on to the oil thrower, irrespective of the relative position of the axle and the axle box. Due to this design it is warranted that under any circumstances the scraping edges will act in an efficient manner and without any danger of one-sided loads caused by a pressure upon the oil thrower placed on the axle being able to make themselves felt.

In the accompanying drawings two practical embodiments of the invention are illustrated by way of example, as follows:

Figure 1 is a section across the tightening chamber and the axle box, seen in an axial direction, whereas Figure 2 is a cross-section of the device along line A—B of Figure 1.

Figure 3 being a cross section of the oil collection chamber along line C—D of Figure 2.

Figure 4 representing the lower part of the device according to Figure 1, but at an enlarged scale.

Figure 5 is a corresponding illustration, embodying a slightly altered type of the device, embodying the invention.

From Figure 1 it can be seen that the axle-journal $a$ is borne in the customary manner within the axle box $b$, the packing chamber $c$ being placed so as to adjoin said axle-box. The device under the present invention is placed within the interior of the aforesaid packing chamber. The device consists of a bearing ring $d$ which, by means of springs, is pressed on to the partition wall $p$, by which the packing chamber $c$ is separated from the axle-box $b$.

The internal surface of said bearing ring $d$ is designed so as to be of spherical shape and to form a segment of a sphere, as can be seen more exactly from Figures 4 and 5.

The oil collection chamber $e$, which is designed as a ring having a U-shaped cross section, is borne on this spherical surface of bearing ring $d$. On its external surface it is of a shape adapted to the corresponding surface of bearing ring $d$, whereby, in its relation to the bearing ring, it is enabled to move in a manner almost resembling that which is rendered possible by a ball bearing. The lateral walls of the oil collection chamber are, in the interior of the latter, provided with oil scraping edges. For this purpose annular members $f$ of sheet metal, spaced from one another, are fixed to the internal walls, the radial edges of said members of sheet metal representing the scraping edges, which form oil collection pockets enclosed between them. It is advisable to cut out a portion, i. e., more exactly the top section of the ring $f$, in order to form in this manner a small discharge channel $g$, by which the oil leaking out in top will be led away in a downward direction.

This method of designing the packing device will result in the fact that inexactitudes which cannot be prevented in manufacturing the axle box, will not display a disadvantageous effect. If, for instance, the partition wall $p$, separating the packing chamber $c$ from the axle box $b$, is not placed so as to be perfectly perpendicular in its relative position to the axle, a danger which frequently will be present, the oil collection chamber e of this device has a possibility of adjusting its position in relation to the bearing ring d, and as a consequence thereof the lateral walls of the oil collection chamber will always be placed in a perpendicular direction, as compared with the axle. In this manner the end will be attained that the oil scraping edges within the oil collection chamber will always be able to press themselves in an unobjectionable manner on to the lateral surface of the splash ring n, whereby it is warranted that the oil will be scraped off in a manner free from objection. The scraping edges, and the sheet metal members f, respectively, will furthermore be prevented from exercising a unilateral pressure upon the oil thrower, which under certain conditions would be liable to injure the surface of the axle-journal at the place where the oil thrower is borne.

The oil collection chamber under the present invention is at its base provided with a discharge opening h, through which the quantity of oil scraped-off can be directly fed back to the oil chamber of axle box b. In order to prevent the oil during this re-feeding action from leaking through into the packing chamber c, an elastic packing plate i is arranged between bearing ring d and partition wall p. As already mentioned above, the bearing ring is pressed on to this partition wall by means of springs. The springs k are, as is to be seen more clearly in Figures 4 and 5, covered by a spring cap l which, on its part, is guided by stems m with apertures appropriate to the purpose. Said stems m can in a simple manner be made of sheet metal pressed so as to have a U-shaped cross section, and can be fixed on the bearing ring d by spot-welding. It is, however, also possible to avail oneself for this purpose of any other fixing method.

The packing plate i can be provided with a reinforcement, which is shown in Figure 4. It can, however, also be provided with jagged projections, shown in Figure 5, which due to the spring pressure will adapt themselves to an unevenness, if any, of the partition wall p within the packing-chamber. A labyrinth-packing with a plurality of packing spaces, one of which is placed behind the other is, so to speak, formed in this manner.

Figure 5 shows a similar design also with regard to the oil thrower (splash ring) n. As can be seen from the illustration, the splash ring n is at the surface, on which it rests, provided with an elastic insertion o, which possesses jagged projections. This insertion can be made of rubber, Buna, synthetic resin or any similar resilient material. In the case of little differences of the axle's diameter said jagged projections will be turned down more or less, wherefore, thanks to this special design of the oil thrower, deviations from the exact diameter of the axle can be overcome. At the same time a certain degree of resilience is imparted to the oil thrower by this insertion, such resilience being desirable for its adjustment relative to the axle and to the scraping edges, respectively.

The oil thrower itself may have any desired cross-section, which is, for instance, either rectangular, angular or T-shaped. If the ring (oil thrower) is not designed in accordance with Figure 5, it will be preferable to cut it through in axial direction, in order to increase its elastic effect, whereby it will be enabled to embrace the axle almost like a piston ring.

Figure 4 illustrates a design of the oil thrower, in which the latter is subdivided into two rings in a direction perpendicular to the axle. The adaptability of the oil thrower is thereby increased and, as a consequence thereof it will be rendered easier to place the device on the axle. It is also possible to provide the oil thrower itself with a groove cut in the middle of it, and serving as an oil discharge channel, as can be seen from Figures 4 and 5.

The primary purpose, for which the device is to be employed, is its use for packing the axle-boxes of railroad cars. It can, however, also be used in the case of any other bearings implying the danger that oil will leak out from them. As far as axle-boxes are concerned, which either do not possess an internal partition wall p, or the internal partition wall p of which is provided with perforations, the packing plate i is, as a matter of course, to be arranged so as to adjoin the external wall of the packing chamber, and must be of such design that the device will be pressed on to said wall.

What I claim is:

1. An arrangement for preventing the escape of oil from the axle boxes of railway vehicles including an axle journalled in the axle box, a chamber adjoining the axle box and perpendicularly disposed with respect to the axle, a rotating resilient oil thrower removably arranged within the chamber and completely surrounding the axle journal, a U-shaped oil collecting member having a curved base and encompassing the oil thrower, oil scraping members on the inner side walls of the oil collecting member and bearing against the oil thrower, a supporting ring for the oil collecting member substantially L-shaped in cross section and having a curved base corresponding to the curvature in the adjacent base of the oil collecting member whereby a limited relative angular movement between the axle journal and the journal box is permitted.

2. An arrangement as claimed in claim 1, in which the oil collecting chamber has a discharge opening therein adjacent the base thereof and a reinforced packing inserted between the vertical wall of the supporting ring and the adjacent chamber wall, said packing being coextensive with the base of the supporting ring.

3. An arrangement for preventing the escape of oil from the axle boxes of railway vehicles including an axle journaled in the axle box, a chamber having inner and outer walls adjoining the axle box and perpendicularly disposed with respect to the axle, a rotating resilient oil thrower bearing against the axle and removably arranged within the chamber, an oil collecting member, U-shaped in cross section surrounding the oil thrower and having a curved base portion, oil scraping members on the inner side walls of the oil collecting member and bearing against the oil thrower, a supporting ring, L-shaped in cross section surrounding the oil collecting member and having a corresponding curved base portion bearing against the curved base portion of the oil collecting member, an elastic packing member interposed between the inner chamber wall and the vertical wall of the supporting ring, and spring means within the chamber bearing against the supporting ring and forcing the supporting ring and the packing toward the inner chamber wall so as to effectively seal the chamber while still permitting a limited relative angular movement between the oil collecting member and the supporting ring to compensate a like movement between the axle and the journal box.

4. An arrangement as claimed in claim 3, in which the packing member is provided with projections on the face thereof adjacent the inner chamber wall thereby forming a jagged surface which effectively seals the chamber.

5. An arrangement as claimed in claim 3, in which the spring means are capped and the supporting ring is provided with U-shaped guide members to accommodate the spring means.

6. An arrangement as claimed in claim 3, in which the oil thrower is provided with a packing insert having a serrated outer face bearing against the axle.

GUSTAV STROMEIER.